United States Patent [19]

Ainslie

[11] Patent Number: 5,110,657
[45] Date of Patent: May 5, 1992

[54] ANTI-SKID COATING COMPOSITION

[75] Inventor: Winston C. Ainslie, Coquitlam, Canada

[73] Assignee: Reichhold Chemicals, Inc., Durham, N.C.

[21] Appl. No.: 526,976

[22] Filed: May 22, 1990

[51] Int. Cl.$^5$ .................... C08L 61/00; B32B 5/22; B05D 1/36
[52] U.S. Cl. .................... 428/141; 428/144; 428/146; 428/147; 428/528; 428/511; 428/220; 428/219; 428/341; 428/326; 428/327; 428/323; 428/514; 427/202; 427/186; 427/195; 524/49; 524/503; 524/15; 525/163
[58] Field of Search .............. 428/141, 144, 146, 147, 428/528, 511, 220, 219, 341, 326, 327, 323, 314; 427/202, 186, 195; 524/49, 503, 15; 525/163

[56] References Cited

U.S. PATENT DOCUMENTS

| | | | |
|---|---|---|---|
| 2,298,664 | 10/1942 | Van Patter | 428/143 |
| 2,592,510 | 4/1952 | Casebolt | 525/163 |
| 2,675,338 | 4/1954 | Phillips | 525/163 |
| 3,527,146 | 9/1970 | Garling | 523/150 |
| 3,598,677 | 8/1971 | Wiest et al. | 524/501 |
| 4,287,311 | 9/1981 | Taniguchi et al. | 428/528 |
| 4,377,649 | 3/1983 | Sweeney et al. | 428/486 |
| 4,555,292 | 11/1985 | Thompson | 428/143 |
| 4,708,978 | 11/1987 | Rodgers | 524/5 |

*Primary Examiner*—Ellis P. Robinson
*Assistant Examiner*—William P. Watkins, III
*Attorney, Agent, or Firm*—Rodman & Rodman

[57] ABSTRACT

An anti-skid coating composition for coating various substrates including structural panel board surfaces, comprises a binder made of urea formaldehyde resin, polyvinyl acetate, ammonium chloride and a dispersant. The binder is used in conjunction with an aggregate, such as walnut shells. A method is also provided for coating the substrates to impart slip resistance thereto.

13 Claims, No Drawings

ANTI-SKID COATING COMPOSITION

BACKGROUND OF THE INVENTION

1. Field of the Invention

This invention relates to anti-skid compositions and is particularly related to an anti-skid composition and method for coating structural panel board and other substrates in order to impart slip resistance thereto.

2. Description of the Prior Art

Plywood is widely used in the construction industry and has been the material traditionally used to sheath sloping roof decks. Plywood, however, is costly and therefore efforts have been made to replace plywood with Waferboard, the trade name for a less expensive structural panel board composed of wood flakes, phenol-formaldehyde resin and slack wax.

Waferboard is generally composed of wafers or flakes of wood, poplar being preferred, of about 0.020 inches to 0.080 inches thick, about 2 inches long and about 2 inches wide. The wafers are bonded together with a waterproof adhesive, such as an isocyanate or phenol formaldehyde, wherein the adhesive solids can vary from about 1 to 5 weight percent of the wood flakes. Waferboard or panel board also generally includes about 0.25 to 0.75 weight percent wax solids to enhance its water repellency.

However, waferboard suffers from inherent disadvantages compared to plywood for roofing applications. When wet, a condition that would be frequently encountered on rooftops exposed to rain, waferboard exhibits a very low coefficient of friction. Consequently, there is an increased danger of slippage to materials and personnel working on sloped roofs which are sheathed with waferboard. Waferboard has a coefficient of friction of about 0.415.

Coefficient of friction ($\mu$) is defined as ratio of the force (F) required to move one surface over another to the total force (W) pressing the two surfaces together in the following relationship:

$$\mu = \frac{F}{W}$$

Although plywood is more expensive than waferboard, it has a much higher surface coefficient of friction and thus does not have the disadvantages of waferboard. Consequently, waferboard has not been heretofore successful in replacing plywood as a material in roof construction.

Efforts to improve the surface coefficient of friction of waferboard have included texturing its surface by using screens and embossed cauls during its manufacture. However, this technique is cumbersome and has not resulted in significant increases in the surface coefficient of friction of the waferboard.

Various anti-skid compositions have been suggested for coating plywood and other structural materials in order to impart slip resistance thereto. For example, U.S. Pat. No. 3,527,146 to Garling discloses a non-skid coating composition which comprises a bonding composition and an aggregate. The aggregate is an elastomeric polymer such as ground vulcanized rubber and can include such ingredients as iron oxide pigment, titanium dioxide and fine silica. Numerous resins are disclosed as the bonding composition, such as various phenol-formaldehyde resins used with urea, and polyvinyl acetate as an aqueous emulsion vehicle.

U.S. Pat. No. 3,598,677 to Bergmeister discloses a method of preventing slippage amongst stacked packages of paper, cardboard and the like by providing a anti-slip adhesive comprising an aqueous dispersion of an adhesive olefinic compound in admixture with inorganic or organic pigments. An aqueous dispersion of polyvinyl acetate is disclosed as an anti-slip adhesive, and wood flour or peanut shell flour are disclosed as fillers for the pigment.

U.S. Pat. No. 2,789,098 to Collinson discloses a resin composition having "non-crazing" characteristics by including furfuraldehyde as a non-crazing agent in the formulation. The composition also includes various nut shell flours such as walnut shell, peanut shell an the like as a cellulose filler, and furfuraldehyde and urea-formaldehyde as an adhesive. Ammonium chloride solution may also be included in the composition as a catalyst.

Chemical Abstracts, Volume 93, No. 244361e, page 310, (1980) discloses that roofing tile supporting materials from plywood or particle board rubbed with coarse abrasive paper and coated with a mixture containing urea resin, ferric oxide, wax emulsion and ammonium chloride, and heated at 80° C. for 10 minutes produces excellent slip-resistant tiles.

Other patents of interest include U.S. Pat. No. 3,681,274 to Oetgen et.al., U.S. Pat. No. 2,873,260 to Corwin, U.S. Pat. No. 3,100,754 to Booth et.al., U.S. Patent No. 2,440,789 to Van der Pyl, and U.S. Pat. No. 2,601,598 to Daniel, Jr.

SUMMARY OF THE INVENTION

The present invention is an anti-skid coating composition which comprises urea formaldehyde resin, polyvinyl acetate, aggregate, ammonium chloride catalyst and a dispersant for the catalyst.

Structural panel board surfaces and other substrates coated with the inventive composition exhibit a high degree of slip resistance and can replace the more expensive plywood for sheathing sloping roof decks and similar structures.

DESCRIPTION OF THE PREFERRED EMBODIMENTS

In accordance with the present invention, it has been discovered that when structural panel board surfaces and other substrates are coated with the anti-skid composition of this invention, the resulting surface coated substrate exhibits a significant increase in coefficient of friction, and can compete commercially with plywood for various uses including sheathing sloping roof decks.

The anti-skid composition of this invention comprises a binder of urea-formaldehyde resin, polyvinyl acetate, ammonium chloride and a dispersant, such as walnut shell powder, in conjunction with coarsely ground aggregate, such as walnut shell aggregate.

In order to produce structural panel board surfaces with sufficient slip-resistant properties, the binder mixture of urea-formaldehyde resin and polyvinyl acetate emulsion with the ammonium chloride catalyst is applied to the panel board surface, followed by the application of the aggregate, and a second coating application of the anti-skid binder composition.

The urea formaldehyde resin functions as a binder for the aggregate. The success of urea formaldehyde as a major component in the anti-skid composition of the present invention was surprising due to the fact that urea formaldehyde resin alone does not possess the water resistant properties necessary for the anti-skid coating composition of this invention.

The reaction product of a minor amount of polyvinyl acetate with urea formaldehyde has been found to dramatically improve the water resistance of the anti-skid coating composition.

The preparation of urea formaldehyde resins is covered in Moslemi, Particleboard, Vol. 1, "Materials", chapter 6, pages 67 to 74 (Southern Illinois University Press, 1974), the disclosure of which is incorporated by reference herein.

It is important that the urea formaldehyde resin in the anti-skid binder composition of this invention be of a highly reactive nature with a boiling water reactivity time of about 25 to 90 seconds. A preferred urea formaldehyde resin is BA-059 TM (Reichhold Chemicals, Inc.) having the following specifications:

| | |
|---|---|
| Non-volatile Content | 60% max. |
| Viscosity (Brookfield at 25° C.) | 350–450 cps |
| Free formaldehyde | 0.2% max. |
| pH | 7.3–7.7 |
| Reactivity at 100° C. (PMT-E20) | 70–90 seconds |
| Specific Gravity | 1.260 |

If desired, melamine formaldehyde resin can be substituted for about 5 to 10 weight % of the urea formaldehyde resin solids. The urea formaldehyde resin generally contains about 55 to 65% non-volatiles, preferably about 60%, and can vary from about 85 to 95%, more preferably about 87.5 to 92.5% by weight of the anti-skid binder composition.

It is important that the amount of polyvinyl acetate in the anti-skid binder composition not fall below about 3 weight %, and can vary from about 3 to about 20% by weight, preferably about 5 to 10% by weight of the binder. The polyvinyl acetate is utilized in the form of an emulsion.

If less than 3 weight % of polyvinyl acetate is used, the weather resistance of the coating will be compromised to the extent that the coated structural panel board will not be able to satisfactorily endure short term exposure. Above about 20 weight % polyvinyl acetate, the pot life will be adversely affected. Cost also becomes a consideration.

The polyvinyl acetate in the binder formulation can be replaced by other equivalent resins such as, for example, ethylene-vinyl acetate copolymer, or an acrylic copolymer, such as DX-101 UNLIPOL TM (Reichhold Chemicals, Inc.) either partially or totally.

The ammonium chloride acts as a catalyst to lower the pH of the mixture and enhances rapid cure of the coating composition.

The amount of ammonium chloride catalyst in the anti-skid binder composition can vary from about 0.25 to 3.0%, preferably from about 0.5 to 1.5 weight %. Less than 0.25% ammonium chloride will give a slow cure. If desired, ammonium sulfate can partially replace the ammonium chloride, or can be used in admixture with the ammonium chloride, in ratios of $NH_4Cl:(NH_4)_2SO_4$ of about 1-99:99-1, respectively.

The ammonium chloride catalyst is usually dispersed by dry blending with a dispersant such as walnut shell powder having a flour-like consistency, preferably with a particle size of about 80% through 325 mesh and a moisture content of about 5%.

As noted, walnut shell powder is not itself a catalyst but is used to disperse the ammonium chloride and to control the viscosity of the coating composition, thus preventing its penetration into the panel board. Moreover, the walnut shell powder is to be distinguished from the walnut shells which can be used as aggregate whose primary function is to impart anti-skid properties to the coating.

Other dispersants can also be used such as pecan shell powder, bark powder, furafil powder, wood powder or wheat powder. These dispersants can be used in place of the walnut shell powder, in admixture therewith, or in admixture with each other. The most important requirement of the dispersant is that it provide a homogenous mix at a sprayable viscosity of about 300 to 1200 centipoise preferably, 400 to 500 centipoise. The amount of dispersant can vary from about 15 to about 60%, preferably from about 20 to about 40% by weight of the ammonium chloride catalyst.

For commercial applications in roof construction, it is necessary that the coating composition cure quickly in order to prevent "blocking" of the stacked coated panel boards after exiting from the press in the mill. Blocking occurs when stacked panels adhere together. This happens when the panels are not fully cured when they enter the stack. Cure time of about $\frac{1}{4}$ to about $1\frac{1}{4}$ minutes at 350° F., preferably about 1 minute at 350° F. is necessary for the composition to be suitable for coating panel board surfaces.

The ingredients of the binder must be blended in proper relative amounts to insure that the resulting coating will meet the required time-temperature cure criteria. The relative amount of each component in the anti-skid binder composition can vary as follows:

| Component | Amount, % by weight |
|---|---|
| Urea Formaldehyde Resin (aqueous) | 85 to 95 |
| Catalyst - composed of ammonium chloride and walnut shell flour | 0.25 to 3 |
| Polyvinyl Acetate Emulsion (aqueous) | 3 to 20 |

The anti-skid binder composition is generally applied to hot structural panel board having a temperature of about 300° to 350° F. in a first coating, with an intermediate aggregate coating, followed by a second coating of the binder composition.

The binder coating is generally applied by spraying at a rate of 95-120 grams per square meter per application while the shell aggregate is generally sprinkled on at a rate of 30-55 grams per square meter of panel board, at a temperature of about 15° to 30° C.

The aggregate in the anti-skid coating composition is used to impart anti-skid properties to the panel board. The amount of aggregate in the anti-skid coating composition depends on the desired extent of anti-skid properties. This amount can vary from about 20 to about 70 grams, and preferably from about 30 to about 55 grams per square meter of structural panel board surface. The aggregate is preferably ground to particle sizes in the range of about 20 mesh to 60 mesh. The amount of aggregate generally varies from about 10 to 30% by weight of the binder.

An aggregate composed of ground walnut shells can conveniently be used and can also be replaced partially or totally by rubber chips, waste plastic aggregate, or other equivalent aggregate material or combination of aggregate material that is economically feasible and that does not dull sawblades, or other cutting blades used in the installation of panel board. Thus, for example, coarse silica would not be an acceptable aggregate material because it acts to dull sawblades used to cut the panel board.

The anti-skid binding composition is uniformly applied as a coating to the panel board surface by spraying or other equivalent means. The amount of coating applied, referred to as the "spread", can vary from about 75 to 140 grams per square meter of the structural panel board surface, preferably from about 95 to about 120 grams per square meter.

The anti-skid binding composition applied to the panel board surface is made by blending liquid urea formaldehyde resin with an aqueous emulsion of polyvinyl acetate and the ammonium chloride-walnut shell flour in suitable blending equipment. The desired mix viscosity can vary from about 400 to about 500 centipoise, as measured by Brookfield viscometer, Model LVF, No. 3 spindle at 60 revolutions per minute (rpm) and 25° C.

It has been found that the anti-skid coating composition of the present invention fulfills the stringent requirements for a non-slip panel board coating which include:
low cost
non-flammability
weather resistance
quick cure
suitability for short production runs
good adhesion In addition, despite the use of urea formaldehyde resin, the emission level of formaldehyde is not significantly raised to an undesirable level. Formaldehyde emissions on the order of about 0.10 to 0.30 mg/liter of formaldehyde can be expected, as determined by the Canadian Test Method for Emission of Formaldehyde From Wood Products—Two Hour Desiccator Test—Issue#2 - 1988 (Formaldehyde Council, 350 Sparks Street, Ottawa, Ontario, Canada K1R 7S8). This is well below the industry norm of about 0.7 mg/liter to 1.4 mg/liter for particleboard. High levels of formaldehyde emission become a concern when storing large quantities of structural panel board in enclosed spaces, such as in warehouses.

Panel board is considered dry at an average moisture content of 8% or less at a relative humidity of 65±1% and a temperature of 20±3° C., in accordance with Canadian Standards Association (CSA) CAN3-0437.0-M85 for waferboard and strandboard.

The following examples further illustrate, specific embodiments of the present invention. All parts and percentages are by weight, unless otherwise indicated.

EXAMPLE 1

An anti-skid binder composition was prepared having the following components:

| Component | Amount parts by weight |
| --- | --- |
| Urea formaldehyde resin (aqueous) | 100 |
| Catalyst - composed of ammonium chloride and walnut shell flour | 4 |
| Polyvinyl acetate emulsion (aqueous) | 5.2 |
| Total | 109.2 |

The binder composition was made in a centerpost mixer having an impeller speed of about 600 revolutions per minute (RPM). The urea formaldehyde resin (BB-032, Reichhold Ltd.) was added first followed by the polyvinyl acetate resin emulsion (DX-101, Reichhold Ltd.). After a brief blending period, the catalyst (DF-212, Reichhold Ltd.) was added, and all components were mixed until homogeneous. The amount of water in the urea formaldehyde resin was 40% by weight, and the amount of water in the polyvinyl acetate resin was about 50% by weight.

The binder composition was applied to 1 foot × 1 foot waferboard panels at a temperature of 350° F. and at a rate of two coats each of 115 gm/m$^2$ with an aggregate coat of ground walnuts having a particle size of about 35 to 60 mesh at a rate of 52 gm/m$^2$ in between.

EXAMPLE 2

An anti-skid binder composition was prepared in accordance with the procedure of Example 1, having the following components:

| Component | Amount, parts by weight |
| --- | --- |
| Urea formaldehyde resin (aqueous) | 90 |
| Catalyst - composed of ammonium chloride and walnut shell flour. | 3.4 |
| Polyvinyl acetate emulsion (aqueous) | 5 |
| Total | 98.4 |

The binder composition was applied to 1 foot × 1 foot waferboard panels at a temperature of 350° F. and at a rate of two coats each of 105 gm/m$^2$ with an aggregate coat of ground walnut having a particle size of 35 to 60 mesh at a rate of 40 gm/m$^2$ in between.

EXAMPLE 3

An anti-skid binder composition was prepared in accordance with the procedure of Example 1, having the following components:

| Component | Amount, parts by weight |
| --- | --- |
| Urea formaldehyde resin (aqueous) | 90 |
| Catalyst - composed of ammonium chloride and walnut shell flour | 3.4 |
| Polyvinyl acetate emulsion (aqueous) | 10 |
| Total | 103.4 |

The binder composition was applied to 1 foot × 1 foot waferboard panels at a temperature of 350° F. and at a rate of two coats each of 95 gm/m$^2$ with an aggregate coat of ground walnuts having a particle size of 35 to 60 mesh at a rate of 30 gm/m$^2$ in between.

EXAMPLE 4

A 1 foot × 1 foot waferboard panel was coated with the anti-skid composition of Example 1. Another 1 foot × 1 foot waferboard panel was untreated. The coefficient of friction of each waferboard panel was then evaluated for different materials that were dragged across the surface of both the treated and untreated panels. Thus, in order to simulate the effect of a shoe with a leather sole, a piece of leather about 6 inches×4 inches bonded with contact cement to a wooded stiffening board, and weighted with a brick, was dragged across the treated and untreated waferboard panels. The respective coefficients of friction were computed for the leather in contact with the coated waferboard and the untreated waferboard.

In similar fashion, a piece of rubber designed to simulate a rubber soled shoe was bonded and weighted in the same manner and dragged across the treated and untreated waferboard panels. The respective coefficients of friction were computed. For comparison purposes, an untreated waferboard panel also weighted in he same manner was dragged across the respective treated and untreated waferboard panels.

The results are tabulated in the following table:

| | Coefficient of Friction | |
|---|---|---|
| Surface | Untreated Waferboard | Treated Waferboard |
| Waferboard, Untreated | 0.415 | 0.507 |
| Leather | 0.457 | 0.673 |
| Rubber | 0.673 | 1.03 |

As can be seen from the results, coefficient of friction was markedly increased in all instances with the inventive anti-skid coating composition.

Although this invention has been described in terms of an anti-skid coating composition for panel board, it is contemplated that the anti-skid coating composition can be applied to various other suitable substrates.

What is claimed is:

1. A weather-resistant temporary anti-skid coating consisting essentially of:
   (a) a binder composition having a viscosity of about 300 to 1200 centipoises comprising:
      (i) about 85 to 95 weight % of an aqueous resin selected from the group consisting of urea-formaldehyde resin, melamine formaldehyde resin, and mixtures thereof;
      (ii) about 3 to 20 weight % of an aqueous emulsion selected from the group consisting of polyvinyl acetate, ethylene-vinyl acetate copolymer and mixtures thereof;
      (iii) a catalyst comprising a salt selected from the group consisting of ammonium chloride, ammonium sulfate and mixtures thereof;
      (iv) a dispersant for said catalyst; and
   (b) an aggregate that does not dull cutting blades having a particle size of about 20 to 60 mesh; wherein the coating is sufficiently viscous to substantially prevent its penetration into a wooden substrate and wherein said coating has a cure time of about ½ to 1½ minutes at about 350° F.

2. The coating of claim 1, wherein the alt catalyst is about 0.25 to 3.0 weight % of the binder composition.

3. The coating of claim 1, wherein the aggregate material is selected from the group consisting of walnut shell aggregate, rubber chips, waste plastic aggregate, and mixtures thereof.

4. The coating of claim 1, wherein the urea formaldehyde resin has a boiling water reactivity of about 25 to 90 seconds.

5. The coating of claim 1, wherein the salt catalyst contains a dispersant varying from about 15 to 60% by weight of the ammonium chloride catalyst.

6. The coating of claim 5, wherein the dispersant is selected from the group consisting of alnut shell powder, pecan shell powder, bark powder, furafil powder, wood powder, wheat powder, and mixtures thereof.

7. The coating of claim 1, wherein the anti-skid binder composition is used in conjunction with a panel board substrate.

8. A weather-resistant laminate having a temporary anti-skid coating consisting essentially of a substrate, a first coating of a binder composition in contact with the substrate comprising:
   (a) about 85 to 95 weight % of an aqueous resin selected from the group consisting of urea-formaldehyde resin, melamine formaldehyde resin, and mixtures thereof;
   (b) about 3 to 20 weight % of an aqueous emulsion selected from the group consisting of polyvinyl acetate, ethylene-vinyl acetate copolymer and mixtures thereof;
   (c) a catalyst comprising a salt selected from the group consisting of ammonium chloride, ammonium sulfate and mixtures thereof;
   (d) a dispersant for said catalyst; and
an intermediate aggregate layer with an aggregate that does not dull cutting blades having a particle size of about 20 to 60 mesh in contact with the first binder coating; and a second top coating of the aforesaid binder composition in contact with the aggregate coating; wherein the binder composition has a viscosity of about 300 to 1200 centipoise, and is sufficiently viscous to substantially prevent its penetration into a wooden substrate, and wherein said composition has a cure time of about ½ to 1½ minutes at about 350° F.

9. The laminate of claim 8, wherein the aggregate material is selected from the group consisting of walnut shell aggregate, rubber chips, waste plastic aggregate, and mixtures thereof.

10. The laminate of claim 8, wherein the substrate is panel board.

11. A method of imparting improved weather-resistant temporary slip resistance to a substrate, consisting essentially of:
   (a) contacting a first coating of an anti-skid binder composition to the substrate surface;
   (b) contacting an aggregate that does not dull cutting blades to the first coating;
   (c) contacting a second coating of said binder composition to the aggregate; wherein said binding composition comprises:
      (i) about an 85 to 95 weight % of an aqueous resin selected from the group consisting of urea-formaldehyde resin, melamine formaldehyde resin, and mixtures thereof;
      (ii) about 3 to 20 weight % of an aqueous emulsion selected from the group consisting of polyvinyl acetate, ethylene-vinyl acetate copolymer, and mixtures thereof;
      (iii) a catalyst comprising a salt selected from the group consisting of ammonium chloride, ammonium sulfate, and mixtures thereof;
      (iv) a dispersant for said catalyst; and wherein the binder composition has a viscosity of about 300 to 1200 centipoise and is made sufficiently viscous to substantially prevent its penetration into a wooden substrate and wherein said composition cures in about ½ to 1½ minutes at about 350° F.

12. The method of claim 11, wherein the binder composition is contacted to the substrate at a rate of about 95 to 120 grams per square meter of surface.

13. The method of claim 11, wherein the aggregate is contacted to the substrate at a rate of about 30 to 55 grams per square meter of surface.

* * * * *

UNITED STATES PATENT AND TRADEMARK OFFICE
CERTIFICATE OF CORRECTION

PATENT NO.  : 5,110,657
DATED       : May 5, 1992
INVENTOR(S) : Winston C. Ainslie It is certified that error appears in the above-identified patent and that said Letters Patent is hereby corrected as shown below:

At column 3, line 63, change "$NH_4Cl:(NH_4),SO_4$" to --$NH_4Cl:(NH_4)_2SO_4$--

At column 4, line 26, change "¼" to --½-- and change "1¼" to --1½--

At column 7, line 60, change "alt" to --salt--

At column 8, line 5, change "alnut" to --walnut--

Signed and Sealed this

Seventeenth Day of August, 1993

Attest:

BRUCE LEHMAN

Attesting Officer

Commissioner of Patents and Trademarks